US012755427B2

(12) United States Patent
Zhang et al.

(10) Patent No.: US 12,755,427 B2
(45) Date of Patent: Oct. 6, 2026

(54) METHODS AND APPARATUS FOR SCALE RECOVERY FROM MONOCULAR VIDEO

(71) Applicant: Intel Corporation, Santa Clara, CA (US)

(72) Inventors: Lidan Zhang, Beijing (CN); Qianying Zhu, Beijing (CN); Xiangbin Wu, Beijing (CN); Xinxin Zhang, Beijing (CN); Fei Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 173 days.

(21) Appl. No.: 18/554,198

(22) PCT Filed: Jun. 25, 2021

(86) PCT No.: PCT/CN2021/102362
§ 371 (c)(1),
(2) Date: Oct. 5, 2023

(87) PCT Pub. No.: WO2022/267000
PCT Pub. Date: Dec. 29, 2022

(65) Prior Publication Data

US 2024/0331195 A1 Oct. 3, 2024

(51) Int. Cl.
*G06T 7/80* (2017.01)
*G06T 7/50* (2017.01)
(Continued)

(52) U.S. Cl.
CPC .................. *G06T 7/80* (2017.01); *G06T 7/50* (2017.01); *G06V 10/26* (2022.01); *G06V 10/82* (2022.01);
(Continued)

(58) Field of Classification Search
CPC ... G06T 7/80; G06T 7/50; G06T 2207/10016; G06T 2207/30252; G06V 20/588; G06V 20/58
See application file for complete search history.

(56) References Cited

U.S. PATENT DOCUMENTS

2016/0050372 A1* 2/2016 Lindner ............. H04N 23/6811 348/46
2017/0061624 A1* 3/2017 Seshadrinathan ...... G01B 11/14
(Continued)

FOREIGN PATENT DOCUMENTS

CN 111079753 A 4/2020
CN 112927159 A 6/2021
WO 2018102697 A1 6/2018

OTHER PUBLICATIONS

Song, Shiyu, and Manmohan Chandraker. "Joint sfm and detection cues for monocular 3d localization in road scenes." In Proceedings of the IEEE Conference on Computer Vision and Pattern Recognition, pp. 3734-3742. 2015. (Year: 2015).*
(Continued)

*Primary Examiner* — Stephen R Koziol
*Assistant Examiner* — Ashley Hytrek
(74) *Attorney, Agent, or Firm* — Hanley, Flight & Zimmerman, LLC

(57) ABSTRACT

Methods, apparatus, systems and articles of manufacture are disclosed for scale recovery from monocular video. An example non-transitory computer readable medium comprises instructions that, when executed, cause a machine to at least segment an input image from a monocular video to detect an object in the camera field, estimate camera parameters from the segmented input image, iteratively refine the estimated camera parameters using known object heights, calculate a scale for the video, iteratively refine the scale
(Continued)

based on a user input, and report the scaling results for visualization.

20 Claims, 13 Drawing Sheets

(51) Int. Cl.
*G06V 10/26* (2022.01)
*G06V 10/82* (2022.01)
*G06V 20/56* (2022.01)
*G06V 20/58* (2022.01)

(52) U.S. Cl.
CPC ........ *G06V 20/588* (2022.01); *G06T 2200/24* (2013.01); *G06T 2207/10016* (2013.01); *G06T 2207/20081* (2013.01); *G06T 2207/20084* (2013.01); *G06T 2207/20092* (2013.01); *G06T 2207/30252* (2013.01); *G06V 20/58* (2022.01)

(56) References Cited

U.S. PATENT DOCUMENTS

| | | | | |
|---|---|---|---|---|
| 2018/0189576 | A1* | 7/2018 | Joshi | G06F 18/24 |
| 2021/0042535 | A1 | 2/2021 | Abbott et al. | |
| 2021/0065391 | A1* | 3/2021 | Tran | G06T 7/20 |

OTHER PUBLICATIONS

S. Song, M. Chandraker and C. C. Guest, "High Accuracy Monocular SFM and Scale Correction for Autonomous Driving, " in IEEE Transactions on Pattern Analysis and Machine Intelligence, vol. 38, No. 4, pp. 730-743, Apr. 1, 2016, doi: 10.1109/TPAMI.2015.2469274. (Year: 2016).*

Sucar, Edgar, and Jean-Bernard Hayet. "Bayesian scale estimation for monocular slam based on generic object detection for correcting scale drift." In 2018 IEEE International Conference on Robotics and Automation (ICRA), pp. 5152-5158. IEEE, 2018. ( Year: 2018).*

Brown, D., Wolfgang, C., & Hanson, R. (2026). Tracker video analysis and modeling tool for physics education. GitHub Pages. https://opensourcephysics.github.io/tracker-website/ (Year: 2026).*

Scaramuzza et al., "Absolute Scale in Structure From Motion From a Single Vehicle Mounted Camera by Exploiting Nonholonomic Constraints," 2009 IEEE 12th International Conference on Computer Vision, Sep. 29, 2009, 7 pages.

Yin et al., "Scale Recovery For Monocular Visual Odometry Using Depth Estimated With Deep Convolutional Neural Fields," 2017 IEEE International Conference on Computer Vision (ICCV), Oct. 2017, 9 pages.

Mur-Artal et al., "ORB-SLAM2: An Open-Source SLAM System for Monocular, Stereo, and RGB-D Cameras," IEEE Transactions on Robotics, vol. 33, Issue 5, Oct. 2017, 8 pages.

Romera et al., "ERFNet: Efficient Residual Factorized ConvNet for Real-Time Semantic Segmentation," IEEE Transactions on Intelligent Transportation Systems, vol. 19, Issue 1, Oct. 9, 2017, 10 pages.

He et al., "Mask R-CNN," 2017 IEEE International Conference on Computer Vision, Oct. 22, 2017, 12 pages.

Garnett et al., "3D-LaneNet: End-to-End 3D Multiple Lane Detection," 2019 IEEE/CVF International Conference on Computer Vision (ICCV), Oct. 27, 2019, 14 pages.

Godard et al., "Digging Into Self-Supervised Monocular Depth Estimation," 2019 IEEE/CVF International Conference on Computer Vision, Oct. 27, 2019, 18 pages.

Zhu et al., "Single View Metrology in the Wild," 2020 European Conference on Computer Vision (ECCV), Aug. 23, 2020, 17 pages.

Wagstaff et al., "Self-Supervised Scale Recovery for Monocular Depth and Egomotion Estimation," 2021 IEEE/RSJ International Conference on Intelligent Robots and Systems (IROS), Sep. 8, 2020, 8 pages.

Xinxin et al., "CSG: Critical Scenario Generation from Real Traffic Accidents," 2020 IEEE Intelligent Vehicles Symposium (IV), Oct. 19, 2020, 7 pages.

Xue et al., "Toward Hierarchical Self-Supervised Monocular Absolute Depth Estimation for Autonomous Driving Applications," 2020 IEEE/RSJ International Conference on Intelligent Robots and Systems (IROS), Oct. 25, 2020, 8 pages.

International Searching Authority, "Written Opinion," issued in connection with International Patent Application No. PCT/CN2021/102362, mailed on Mar. 23, 2022, 3 pages.

International Searching Authority, "International Search Report," issued in connection with International Patent Application No. PCT/CN2021/102362, mailed on Mar. 23, 2022, 3 pages.

Taiwan Intellectual Property Office, "Non-Final Rejection," issued in connection with Taiwanese Patent Application No. 111109909, dated Jan. 27, 2026, 10 pages. [Machine Translation Included].

Taiwan Intellectual Property Office, "Search Report," issued in connection with Taiwanese Patent Application No. 111109909, dated Jan. 27, 2026, 4 pages. [Machine Translation Included].

* cited by examiner

METHODS AND APPARATUS FOR SCALE RECOVERY FROM MONOCULAR VIDEO

RELATED APPLICATIONS

This patent arises from a national stage of International Patent Application No. PCT/CN2021/102362, which is entitled "METHODS AND APPARATUS FOR SCALE RECOVERY FROM MONOCULAR VIDEO," which was filed on Jun. 25, 2021. Priority to International Patent Application No. PCT/CN2021/102362 is hereby claimed.

FIELD OF THE DISCLOSURE

This disclosure relates generally to video and/or image processing, and, more particularly, to methods and apparatus for absolute scale recovery from monocular video.

BACKGROUND

The autonomous driving industry is rapidly growing. Autonomous vehicles utilize many types of sensors for detecting roads, obstacles, traffic control devices, etc. One type of sensor is a monocular video camera (e.g., a dashcam, roof mounted camera, etc.), which is a video capture device that uses a single vision path to capture a 2-dimensional image (unlike a binocular or stereo-vision device). Such monocular video cameras are increasingly preferred over stereo video cameras as input devices for autonomous driving systems due to their low expense and easy operability.

Figure 1:
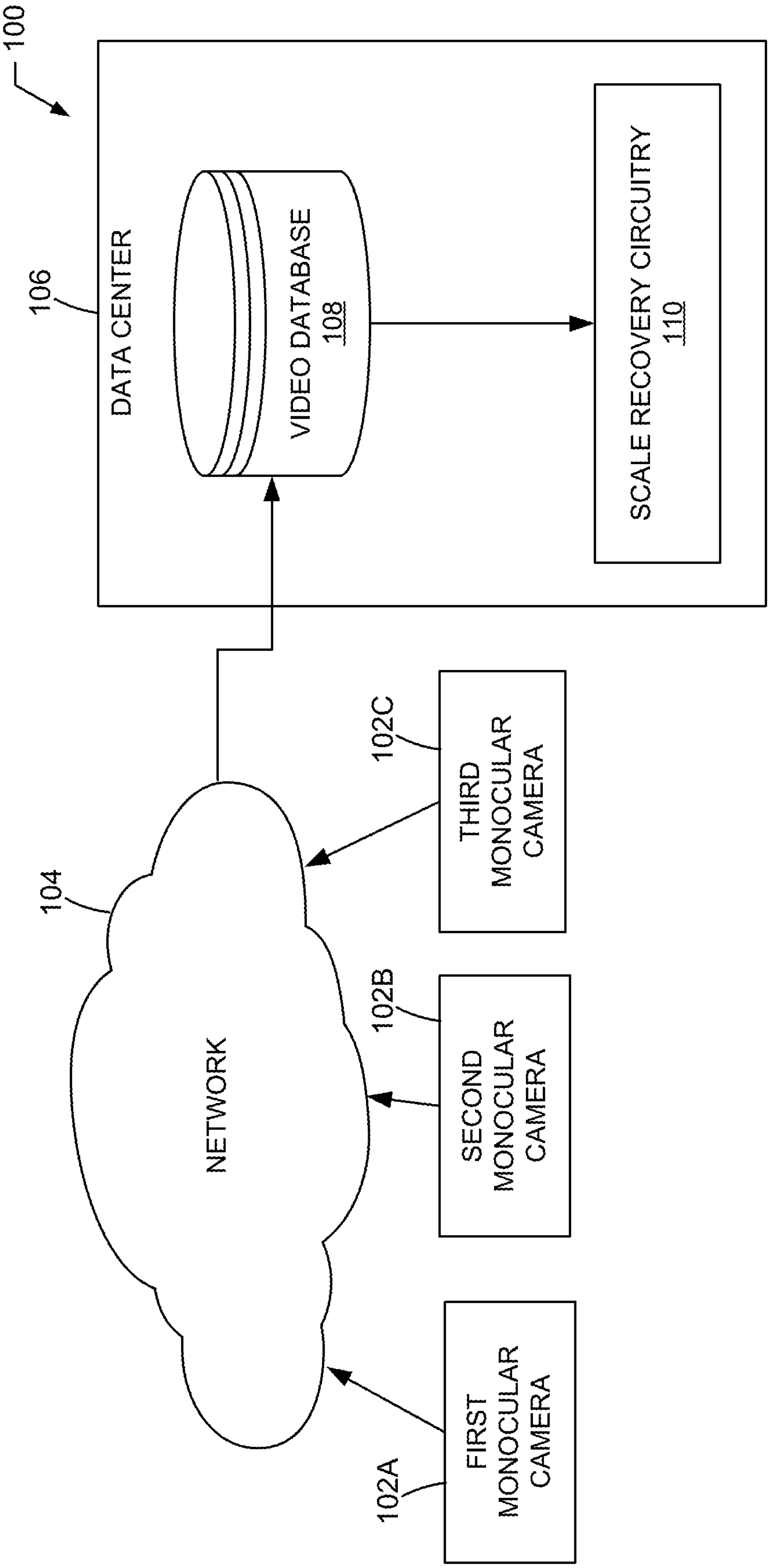
FIG. 1 is a block diagram of an example environment in which an input video from at least one monocular camera, is accepted in a data center, wherein a scale recovery circuitry is used in conjunction with a video database for scale recovery.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In some examples disclosed herein, a Neural Network (NN) model is used. Using a Neural Network (NN) model enables the interpretation of data wherein patterns can be recognized. In general, machine learning models/architectures that are suitable to use in the example approaches disclosed herein will be Convolutional Neural Network (CNN) and/or Deep Neural Network (DNN), wherein interconnections are not visible outside of the model. However, other types of machine learning models could additionally or alternatively be used such as Recurrent Neural Network (RNN), Support Vector Machine (SVM), Gated Recurrent Unit (GRU), Long Short Term Memory (LSTM), etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using known object heights (e.g., pedestrian height and/or car height). However, any other training algorithm may additionally or alternatively be used. In examples disclosed herein, training is performed on the object height branch, after object heights of various objects (e.g., pedestrian heights) are calculated within each frame of the input monocular video.

In some examples, the ML/AI models may be additionally trained using known object widths (e.g., pedestrian width and/or car width). However, any other training algorithm may additionally or alternatively be used. In some examples, training may be performed on the object width branch, after object widths of various objects (e.g., pedestrian widths) are calculated within each frame of the input monocular video.

In examples disclosed herein, the "object height branch" refers to an example branch of the network model that is used to output object height (e.g., car height, pedestrian height, etc.). In addition to the object height branch, in some examples, one or more of a segmentation backbone network, Feature Pyramid Network (FPN) for object detection, and/or Region of Interest (ROI) network generate an object detection branch for the neural network model consisting of three convolutional layers Training is performed using hyperparameters that control how the learning is performed (e.g., a learning rate, a number of layers to be used in the machine learning model, etc.).

Training is performed using training data. In examples disclosed herein, the training data originates from the publicly-available KITTI Vision Benchmark dataset. However, any type of dataset of image, video, and/or vision data may be utilized.

When a monocular video is taken for autonomous driving purposes, etc. the input video has limited scope for application in traffic simulation, car trajectory prediction, etc. due to an inability to efficiently recover camera scaling factors from the video.

Current approaches to recover camera parameters and/or scale values from monocular video require a knowledge of the object class (e.g., camera height, camera angle, etc.), which will prove to be unhelpful for applications wherein these parameters are unknown.

Example methods and apparatus disclosed herein receive an input monocular video and process the input without a need for knowledge of any object class parameters to generate a scaling factor. Having the ability to recover scale from these monocular video cameras allows for the capacity to run simulations of car trajectories, etc. from traffic cameras for use in court cases, insurance disputes, etc. Examples disclosed herein utilize scale recovery techniques such as, for example, image segmentation, lane detection, objection detection, etc. to determine camera parameters (e.g., camera height and camera pitch) from an input monocular video. As used herein, "absolute scale" may refer to a scaling factor that is obtained from a zero point, and that which progresses in only one direction, as opposed to a relative scaling that can involve multiple directions and any given starting point in a field. Additionally, in examples disclosed herein, the scale recovery system 100 may hereafter be referred to as the "absolute scale recovery system" 100.

FIG. 1 illustrates an example scale recovery system 100 in accordance with the teachings of this disclosure implemented in an example network environment 104. The example network environment 104 includes an example user data center 106 and an example set of monocular cameras 102A, 102B, and 102C. The example data center 106 includes an example video database 108, associated with an example scale recovery circuitry 110.

In some examples, the first, second, and/or third monocular cameras 102A, 102B, and/or 102C may be directly linked to the scale recovery circuitry 110, to provide input monocular video at different times to the scale recovery circuitry 110, eliminating the need for a network environment 104 and/or a video database 108 within a data center 106.

The example monocular cameras 102A, 102B, and 102C are vehicle-mounted video cameras that utilize a single image sensor to capture images through a single image path. Alternatively, any other type of camera or image capture device (e.g., infrared cameras, fixed-mounted cameras, portable cameras, user-carried cameras, etc.) may be utilized to provide an input video to the example scale recovery circuitry 110 for scale recovery.

While the example of FIG. 1 communicatively couples components via a network 104, any one or more networks of one or more types may be utilized. For example, the network 104 may be implemented by any combination of local area networks, wide area networks, wired networks, wireless networks, etc.

Figure 2:
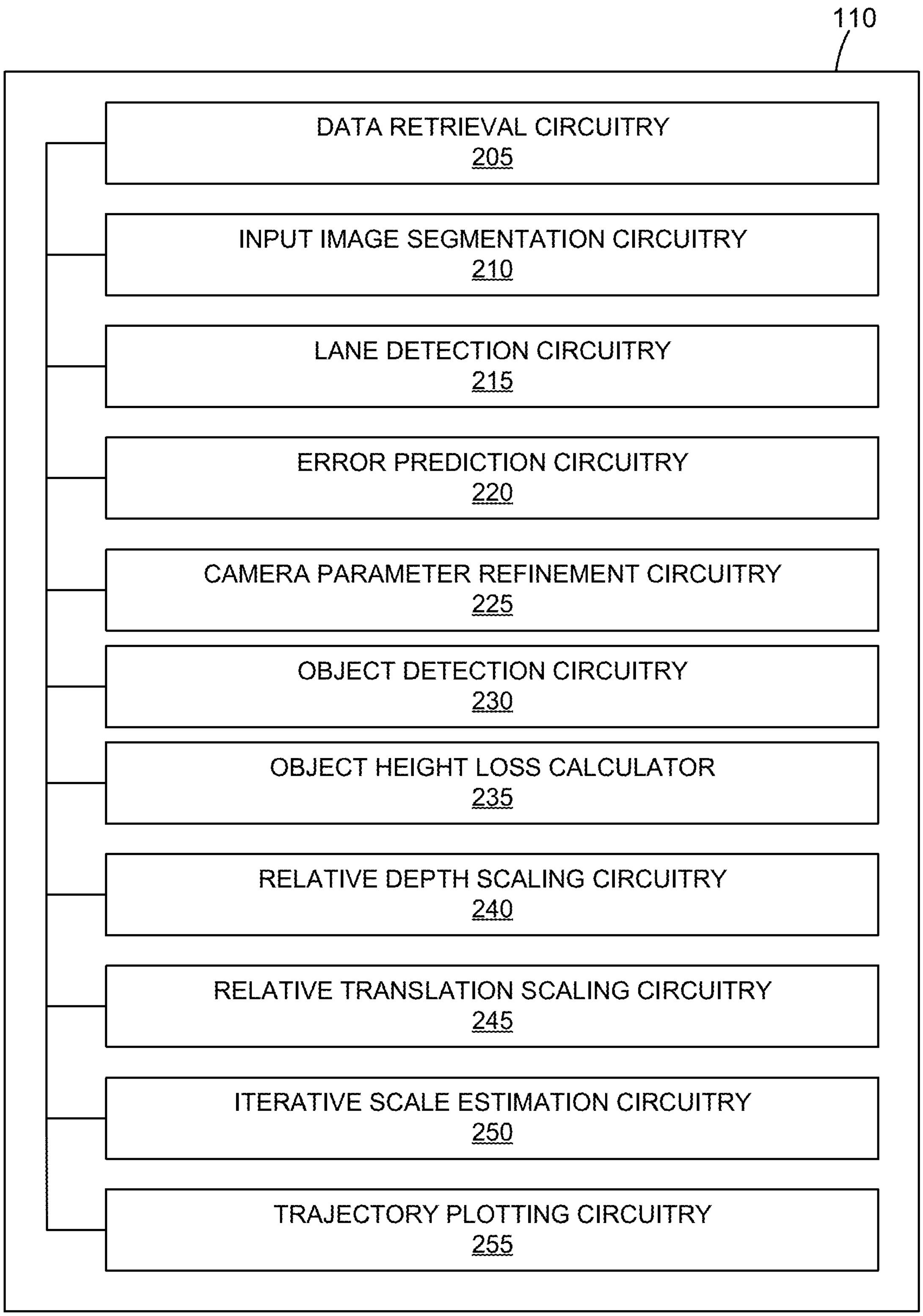
FIG. 2 is a block diagram of an example implementation of the scale recovery circuitry of FIG. 1.

FIG. 2 illustrates an example implementation of the scale recovery circuitry 110 of FIG. 1 to operate within an example data center and to receive input from at least one of the monocular video cameras 102A, 102B, and/or 102C via a network 140.

The example data retrieval circuitry 205 communicates with the video database 108 of FIG. 1 and/or directly with at least one of the monocular cameras 102A, 102B, and/or 102C through a network 104 to fetch a monocular input video for scale recovery processing. In some examples, the data retrieval circuitry 205 may be configured to pull data from the Internet or other sources not on the local network environment 104.

The example input image segmentation circuitry 210 processes the input video retrieved from the video database 108 to identify road geometry by running each individual video frame through a segmentation backbone network (e.g., Efficient Residual Factorized ConvNet (ERFNet)). The segmentation backbone network parses the images and outputs a composite two-dimensional video with the road geometry and surrounding objects highlighted for further processing.

The example lane detection circuitry 215 runs the identified road geometry in the two-dimensional output of the segmentation backbone network of the example input image segmentation circuitry 210 through a neural network (e.g., 3D-LaneNet network) to determine the layout of lanes on the road in the monocular video input. The neural network processes the segmented video frame-by-frame to predict the three-dimensional layout of lanes on the road for each image. The lane detection circuitry 215 estimates the camera height relative to the ground plane by estimating the road projection plane. The road image is projected into a virtual top view model, and the relative projection for the whole scene is recovered from this model.

The example error prediction circuitry 220 calculates the error of prediction and ground-truth. This error loss is calculated on the top-view model generated by the example lane detection circuitry 215, with cross-entropy and offsets with anchors. The total camera parameter error is estimated as the sum of the camera calibration parameter loss and the lane detection loss.

The camera calibration parameter loss is calculated using the equation $\mathcal{L}_{calib}=|\theta-\hat{\theta}|+|h_{cam}-\widehat{h_{\text{cam}}}||$, wherein θ refers to the actual pitch of the camera, $\hat{\theta}$ refers to the estimated camera pitch, $h_{cam}$ refers to the actual height of the camera, and $\widehat{h_{\text{cam}}}$ refers to the estimated camera height. The lane detection loss is calculated using the equation $$\sum_{t\in\{c,l\}}\sum_{i=1}^{N}\left(\widehat{p_t^i}\log p_t^i+(1-\widehat{p_t^i})\log\left(1-p_t^i\right)\right)+\sum_{t\in\{c,l\}}\sum_{i=1}^{N}\left(\left\|\widehat{x_t^i}-x_t^i\right\|+\left\|\widehat{z_t^i}-z_t^i\right\|_1\right),$$

wherein {c, l} denote lane type (e.g., centerlines, lane delimiters, etc.), $$p_t^i$$

represents the confidence and/or probability of an anchor being a centerline and/or lane delimiter, as used for a cross-entropy loss calculation, and $$x_t^i$$

and $$z_t^i$$

refer to the i-th 3D lane, wherein each lane is a set of points for estimated x and $z$-plane coordinates.

The example camera parameter refinement circuitry 225 utilizes a cascade structure to iteratively refine the camera parameters (e.g., camera height and/or camera pitch), to minimize the error that was predicted by the error prediction circuitry 220, to produce estimated camera height and camera pitch values.

The example object detection circuitry 230 leverages a neural network (e.g., Mask RCNN neural network) to automatically detect all cars and pedestrians in each frame of the monocular input video. These detected objects form the detection branch of the neural network.

The example object height loss calculator 235 trains the object branch of the neural network used by the example object detection circuitry 230 with a Gaussian model. The object branch of the neural network is trained using a publicly available dataset which contains known pedestrian heights and car heights (e.g., KITTI dataset). Object height loss is then calculated by considering the difference between the estimated object heights and the actual object heights provided by the object and detection branches of the neural network.

In some examples, the object height loss calculator 235 may be implemented such that the dataset containing known objects heights (e.g., car height and pedestrian height) is stored locally in the video database 108 of FIG. 1.

The example relative depth scaling circuitry 240 obtains a ground points mask from the monocular video and reprojects the ground mask points to a three-dimensional world space to estimate the relative depth value. The ground mask points are determined by projecting all image pixels into the 3D space and collecting eight neighboring points of these coordinates. From the neighboring points, four local surfaces are derived by selecting four pairs of points that form 90-degree angles. The final surface norm of each world coordinate is the average of its four neighboring surfaces. Then, the angle between the world coordinate and ground is considered to determine whether the examined point is on the ground.

The relative depth scaling circuitry 240 determines the relative depth of the monocular video by dividing the estimated camera height, as defined by the camera parameter refinement circuitry 225, by the current predicted height for the frame. In some examples, the relative depth scaling circuitry 240 may calculate relative scale for each frame independently, or as a whole.

The example relative translation scaling circuitry 245 takes the estimated depth value, as given by the example relative depth scaling circuitry 240, and projects all image points into the three-dimensional world space using that depth. The relative translation is then calculated using a least-squares approach with the equation $$S_{depth}^t=\frac{h_{cam}}{h_M^t},$$

wherein $h_{cam}$ is the predicted height of the camera, and $$h_M^t$$

is the height of the camera at the t-th frame of the input video.

Figure 7:
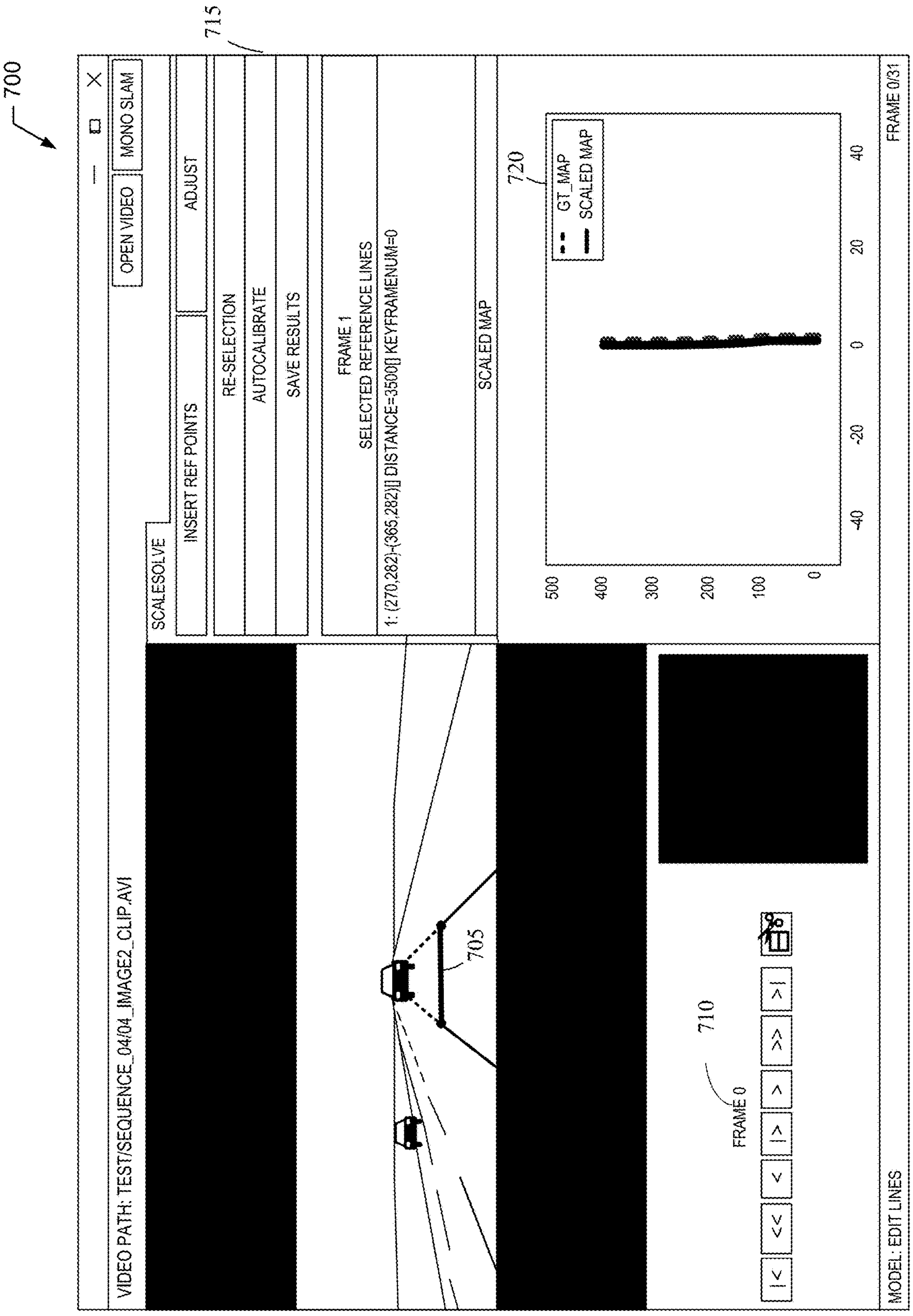
FIG. 7 is an illustration of an example user interface through which scaling factor results are visualized, and/or a user can iteratively refine a scaling factor for at least one of the monocular input cameras of FIG. 1.

The example iterative scale estimation circuitry 250 gathers user input from the example graphical user interface illustrated in FIG. 7 and adjusts the scale calculations accordingly. In some examples, the graphical user interface allows a user to draw a line between any two points (e.g., between lane lines) in a video frame and provide the length (in meters) of that line. The iterative scale estimation circuitry 250 then calculates the distance error for all lines, given the distance provided by the user between two chosen lines in the input video. The distance samples with the lowest average projection error are collected from the three-dimensional parameter space, and these samples are then average to determine the scale value.

In some examples, user input may be provided to the iterative scale estimation circuitry 250 via the graphical user interface of FIG. 7 before the automatic scale calculations of the error prediction circuitry 220, camera parameter refinement circuitry 225, object height loss calculator 235, relative depth scaling circuitry 240, and/or relative translation scaling circuitry 245 are initiated.

The example trajectory plotting circuitry 255 maps the current trajectory of the car based on the calculated scaling factor and the environmental conditions provided by the input monocular video. This trajectory is displayed as a graph on the example graphical user interface depicted in FIG. 7.

In some examples, the example data retrieval circuitry 205 of FIG. 2 includes means for retrieving a monocular input video for processing from a video database and/or monocular video camera. For example, the means for retrieving a monocular input video for processing from a video database and/or monocular video camera may be implemented by data retrieval circuitry 205. In some examples, the data retrieval circuitry 205 may be implemented by machine executable instructions such as that implemented by at least block 302 of FIG. 3 executed by processor circuitry, which may be implemented by the example processor circuitry 1025 of FIG. 10, the example processor circuitry 1100 of FIG. 11, and/or the example Field Programmable Gate Array (FPGA) circuitry 1200 of FIG. 12. In other examples, the data retrieval circuitry 205 is implemented by other hardware logic circuitry, hardware implemented state machines, and/or any other combination of hardware, software, and/or firmware. For example, the data retrieval circuitry 205 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example input image segmentation circuitry 210 of FIG. 2 includes means for processing an input video with a segmentation backbone network to detect objects. For example, the means for processing an input video with a segmentation backbone network to detect objects may be implemented by input image segmenting circuitry 210. In some examples, the input image segmenting circuitry 210 may be implemented by machine executable instructions such as that implemented by at least blocks 402 and/or 404 of FIG. 4 executed by processor circuitry, which may be implemented by the example processor circuitry 1025 of FIG. 10, the example processor circuitry 1100 of FIG. 11, and/or the example Field Programmable Gate Array (FPGA) circuitry 1200 of FIG. 12. In other examples, the input image segmenting circuitry 210 is implemented by other hardware logic circuitry, hardware implemented state machines, and/or any other combination of hardware, software, and/or firmware. For example, the input image segmenting circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example lane detection circuitry 215 of FIG. 2 includes means for detecting road lanes in a monocular input video using a segmentation backbone network. For example, the means for detecting road lanes in a monocular input video using a segmentation backbone network may be implemented by lane detecting circuitry 215. In some examples, the lane detecting circuitry 215 may be implemented by machine executable instructions such as that implemented by at least block 304 of FIG. 3 executed by processor circuitry, which may be implemented by the example processor circuitry 1025 of FIG. 10, the example processor circuitry 1100 of FIG. 11, and/or the example Field Programmable Gate Array (FPGA) circuitry 1200 of FIG. 12. In other examples, the lane detecting circuitry 215 is implemented by other hardware logic circuitry, hardware implemented state machines, and/or any other combination of hardware, software, and/or firmware. For example, the lane detecting circuitry 215 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example error prediction circuitry 220 of FIG. 2 includes means for calculating estimated camera parameter error. For example, the means for calculating estimated camera parameter error may be implemented by error predicting circuitry 220. In some examples, the error predicting circuitry 220 may be implemented by machine executable instructions such as that implemented by at least block 506 of FIG. 5 executed by processor circuitry, which may be implemented by the example processor circuitry 1025 of FIG. 10, the example processor circuitry 1100 of FIG. 11, and/or the example Field Programmable Gate Array (FPGA) circuitry 1200 of FIG. 12. In other examples, the error predicting circuitry 220 is implemented by other hardware logic circuitry, hardware implemented state machines, and/or any other combination of hardware, software, and/or firmware. For example, the error predicting circuitry 220 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example camera parameter refinement circuitry 225 of FIG. 2 includes means for adjusting the estimated camera parameters (e.g., camera height and camera pitch) to minimize the predicted error. For example, the means for adjusting the estimated camera parameters (e.g., camera height and camera pitch) to minimize the predicted error may be implemented by camera parameter refining circuitry 225. In some examples, the camera parameter refining circuitry 225 may be implemented by machine executable instructions such as that implemented by at least block 306 of FIG. 3 executed by processor circuitry, which may be implemented by the example processor circuitry 1025 of FIG. 10, the example processor circuitry 1100 of FIG. 11, and/or the example Field Programmable Gate Array (FPGA) circuitry 1200 of FIG. 12. In other examples, the camera parameter refining circuitry 225 is implemented by other hardware logic circuitry, hardware implemented state machines, and/or any other combination of hardware, software, and/or firmware. For example, the camera parameter refining circuitry 225 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example object detection circuitry 230 of FIG. 2 includes means for detecting objects (e.g., pedestrians, trees, traffic lights, etc.) within a road scene given a segmented input video. For example, the means for detecting objects (e.g., pedestrians, trees, traffic lights, etc.) within a road scene given a segmented input video may be implemented by object detecting circuitry 230. In some examples, the object detecting circuitry 230 may be implemented by machine executable instructions such as that implemented by at least block 502 of FIG. 5 executed by processor circuitry, which may be implemented by the example processor circuitry 1025 of FIG. 10, the example processor circuitry 1100 of FIG. 11, and/or the example Field Programmable Gate Array (FPGA) circuitry 1200 of FIG. 12. In other examples, the object detecting circuitry 230 is implemented by other hardware logic circuitry, hardware implemented state machines, and/or any other combination of hardware, software, and/or firmware. For example, the object detecting circuitry 230 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example object height loss calculator 235 of FIG. 2 includes means for determining the calculated height differences in any one given object across each frame of a video. For example, the means for determining the calculated height differences in any one given object across each frame of a video. may be implemented by object height loss calculating circuitry 235. In some examples, the object height loss calculating circuitry 235 may be implemented by machine executable instructions such as that implemented by at least blocks 504, 506, and/or 508 of FIG. 5 executed by processor circuitry, which may be implemented by the example processor circuitry 1025 of FIG. 10, the example processor circuitry 1100 of FIG. 11, and/or the example Field Programmable Gate Array (FPGA) circuitry 1200 of FIG. 12. In other examples, the object height loss calculating circuitry 235 is implemented by other hardware logic circuitry, hardware implemented state machines, and/or any other combination of hardware, software, and/or firmware. For example, the object height loss calculating circuitry 235 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example relative depth scaling circuitry 240 of FIG. 2 includes means for determining the relative depth value using projection models for a monocular input video. For example, the means for determining the relative depth value using projection models for a monocular input video may be implemented by relative depth scaling circuitry 240. In some examples, the relative depth scaling circuitry 240 may be implemented by machine executable instructions such as that implemented by at least blocks 602 and/or 604 of FIG. 6 executed by processor circuitry, which may be implemented by the example processor circuitry 1025 of FIG. 10, the example processor circuitry 1100 of FIG. 11, and/or the example Field Programmable Gate Array (FPGA) circuitry 1200 of FIG. 12. In other examples, the relative depth scaling circuitry 240 is implemented by other hardware logic circuitry, hardware implemented state machines, and/or any other combination of hardware, software, and/or firmware. For example, the relative depth scaling circuitry 240 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example relative translation scaling circuitry 245 of FIG. 2 includes means for determining the relative translation value using projection models for a monocular input video. For example, the means for determining the relative translation value using projection models for a monocular input video may be implemented by relative translation scaling circuitry 245. In some examples, the relative translation scaling circuitry 245 may be implemented by machine executable instructions such as that implemented by at least blocks 606 and/or 608 of FIG. 6 executed by processor circuitry, which may be implemented by the example processor circuitry 1025 of FIG. 10, the example processor circuitry 1100 of FIG. 11, and/or the example Field Programmable Gate Array (FPGA) circuitry 1200 of FIG. 12. In other examples, the relative translation scaling circuitry 245 is implemented by other hardware logic circuitry, hardware implemented state machines, and/or any other combination of hardware, software, and/or firmware. For example, the relative translation scaling circuitry 245 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example iterative scale estimation circuitry 250 of FIG. 2 includes means for using a provided user input to estimate the scale of a monocular video. For example, the means for using a provided user input to estimate the scale of a monocular video may be implemented by iterative scale estimating circuitry 250. In some examples, the iterative scale estimating circuitry 250 may be implemented by machine executable instructions such as that implemented by at least block 310 of FIG. 3 executed by processor circuitry, which may be implemented by the example processor circuitry 1025 of FIG. 10, the example processor circuitry 1100 of FIG. 11, and/or the example Field Programmable Gate Array (FPGA) circuitry 1200 of FIG. 12. In other examples, the iterative scale estimating circuitry 250 is implemented by other hardware logic circuitry, hardware implemented state machines, and/or any other combination of hardware, software, and/or firmware. For example, the iterative scale estimating circuitry 250 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the example trajectory plotting circuitry 255 of FIG. 2 includes means for plotting the estimated trajectory of an ego vehicle in real-time given an input video. For example, the means for plotting the estimated trajectory of an ego vehicle in real-time given an input video may be implemented by the trajectory plotting circuitry 255. In some examples, the trajectory plotting circuitry 255 may be implemented by machine executable instructions such as that implemented by at least block 310 of FIG. 3 executed by processor circuitry, which may be implemented by the example processor circuitry 1025 of FIG. 10, the example processor circuitry 1100 of FIG. 11, and/or the example Field Programmable Gate Array (FPGA) circuitry 1200 of FIG. 12. In other examples, the trajectory plotting circuitry 255 is implemented by other hardware logic circuitry, hardware implemented state machines, and/or any other combination of hardware, software, and/or firmware. For example, the trajectory plotting circuitry 255 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the scale recovery circuitry 110 of FIG. 1 is illustrated in FIG. 2, one or more of the elements, processes and/or devices illustrated in FIG. 1 may be combined, divided, re-arranged, omitted, eliminated and/or implemented in any other way. Further, the example data retrieval circuitry 205, input image segmentation circuitry 210, lane detection circuitry 215, error prediction circuitry 220, camera parameter refinement circuitry 225, object detection circuitry 230, object height loss calculator 235, relative depth scaling circuitry 240, relative translation scaling circuitry 245, iterative scale estimation circuitry 250, trajectory plotting circuitry 255, and/or, more generally, the scale recovery circuitry 110 of FIG. 1 may be implemented by hardware, software, firmware and/or any combination of hardware, software and/or firmware. Thus, for example, any of the example data retrieval circuitry 205, input image segmentation circuitry 210, lane detection circuitry 215, error prediction circuitry 220, camera parameter refinement circuitry 225, object detection circuitry 230, object height loss calculator 235, relative depth scaling circuitry 240, relative translation scaling circuitry 245, iterative scale estimation circuitry 250, trajectory plotting circuitry 255, and/or, more generally, the scale recovery circuitry 110 of FIG. 1 could be implemented by processor circuitry, analog circuit(s), digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)) such as Field Programmable Gate Arrays (FPGAs). When reading any of the apparatus or system claims of this patent to cover a purely software and/or firmware implementation, at least one of the example data retrieval circuitry 205, input image segmentation circuitry 210, lane detection circuitry 215, error prediction circuitry 220, camera parameter refinement circuitry 225, object detection circuitry 230, object height loss calculator 235, relative depth scaling circuitry 240, relative translation scaling circuitry 245, iterative scale estimation circuitry 250, trajectory plotting circuitry 255, and/or, more generally, the scale recovery circuitry 110 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example data retrieval circuitry 205, input image segmentation circuitry 210, lane detection circuitry 215, error prediction circuitry 220, camera parameter refinement circuitry 225, object detection circuitry 230, object height loss calculator 235, relative depth scaling circuitry 240, relative translation scaling circuitry 245, iterative scale estimation circuitry 250, trajectory plotting circuitry 255, and/or more generally, the scale recovery circuitry 110 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the scale recovery system 100 of FIG. 1 is illustrated in FIG. 2, one or more of the elements, processes and/or devices illustrated in FIG. 2 may be combined, divided, re-arranged, omitted, eliminated and/or implemented in any other way. Further, the example data retrieval circuitry 205, input image segmentation circuitry 210, lane detection circuitry 215, error prediction circuitry 220, camera parameter refinement circuitry 225, object detection circuitry 230, object height loss calculator 235, relative depth scaling circuitry 240, relative translation scaling circuitry 245, iterative scale estimation circuitry 250, and/or trajectory plotting circuitry 255 may be implemented by hardware, software, firmware and/or any combination of hardware, software and/or firmware. Thus, for example, any of the example data retrieval circuitry 205, input image segmentation circuitry 210, lane detection circuitry 215, error prediction circuitry 220, camera parameter refinement circuitry 225, object detection circuitry 230, object height loss calculator 235, relative depth scaling circuitry 240, relative translation scaling circuitry 245, iterative scale estimation circuitry 250, trajectory plotting circuitry 255, and/or, more generally, the example scale recovery system 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data retrieval circuitry 205, the example input image segmentation circuitry 210, the example lane detection circuitry 215, the example error prediction circuitry 220, the example camera parameter refinement circuitry 225, the example object detection circuitry 230, the example object height loss calculator 235, the example relative depth scaling circuitry 240, the example relative translation scaling circuitry 245, the example iterative scale estimation circuitry 250, and/or the example trajectory plotting circuitry 255 is/are hereby expressly defined to include a non-transitory computer readable storage device or storage disk such as a memory, a digital versatile disk (DVD), a compact disk (CD), a Blu-ray disk, etc. including the software and/or firmware. Further still, the example scale recovery system 100 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Figure 3:
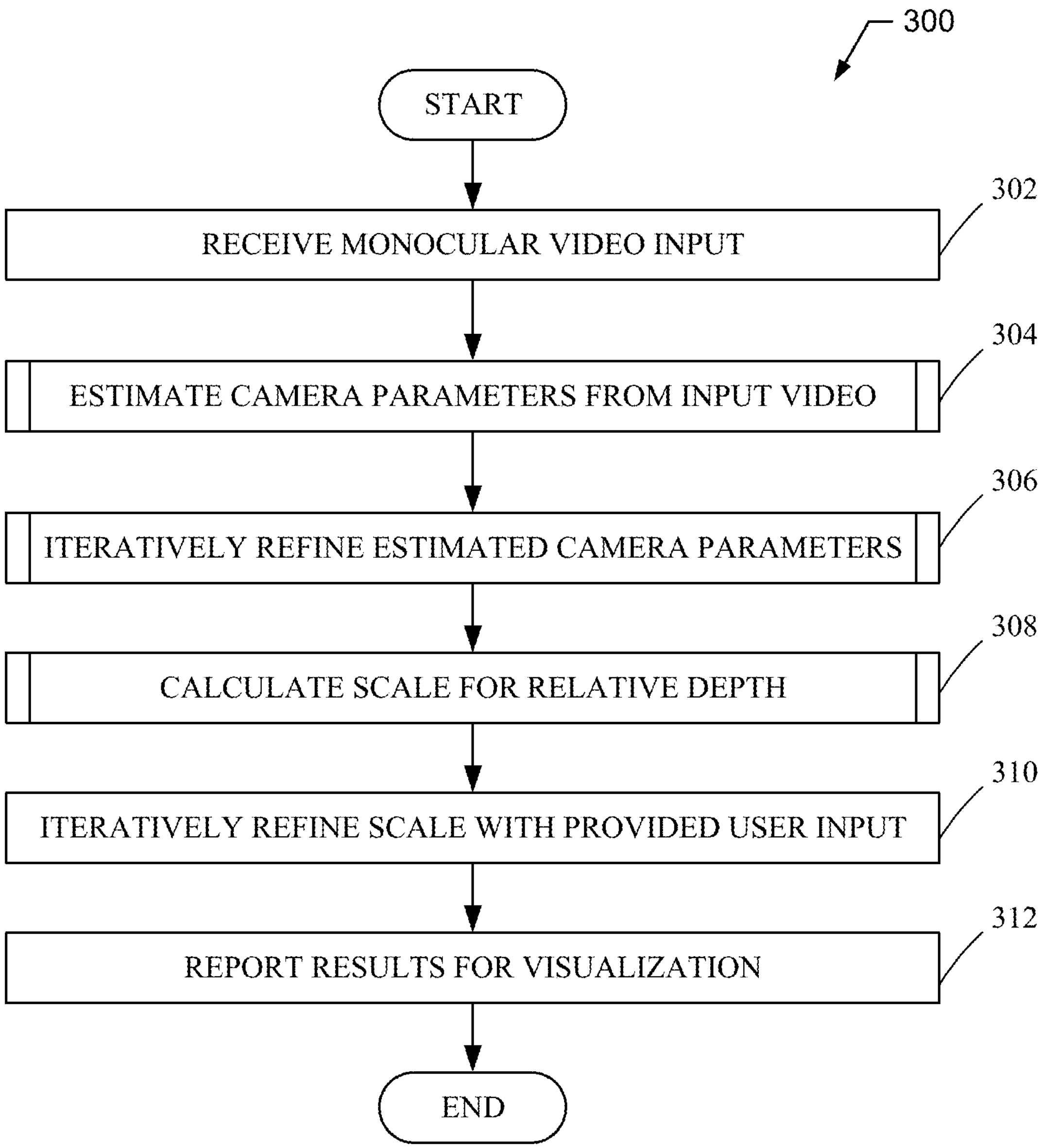
FIG. 3-6 are flowcharts representative of example machine readable instructions which may be executed to implement the example scale recovery system of FIGS. 1 and/or 2, in accordance with the teachings of this disclosure.

A flowchart representative of example hardware logic, machine readable instructions, hardware implemented state machines, and/or any combination thereof for implementing the scale recovery circuitry 110 of FIG. 1 is shown in FIG. 3. The machine readable instructions may be one or more executable programs or portion(s) of an executable program for execution by a computer processor such as the processor 1025 shown in the example processor platform 1000 discussed below in connection with FIG. 3. The program may be embodied in software stored on a non-transitory computer readable storage medium such as a CD-ROM, a floppy disk, a hard drive, a DVD, a Blu-ray disk, or a memory associated with the processor 1025, but the entire program and/or parts thereof could alternatively be executed by a device other than the processor 1025 and/or embodied in firmware or dedicated hardware. Further, although the example program is described with reference to the flowchart illustrated in FIG. 3, many other methods of implementing the example scale recovery circuitry 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 3-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions 300 that may be executed by a processor to implement the example scale recovery circuitry 110 of FIGS. 1 and/or 2 to recover the scale of an input monocular video.

As illustrated in FIG. 3, at block 302, the scale recovery circuitry 110 receives a monocular video input from the video database 108 of FIG. 1. At least one of the monocular cameras 102A, 102B, and/or 102C of FIG. 1 provide these input videos through the network 104 for storage and retrieval in the video database 108.

At block 304, the camera parameters (e.g., camera height and/or camera pitch) are estimated. An example process for estimating camera parameters is described in conjunction with FIG. 4.

At block 306, the camera parameters (e.g., camera height and/or camera pitch) are iteratively refined. The camera parameters estimated from the segmented video are adjusted after the object height branch is trained with known object (e.g., pedestrians, cars, etc.) heights and the object consistency loss is calculated and minimized. An example process for iteratively refining the camera parameters is described in conjunction with FIG. 5.

At block 308, the scale for relative depth is calculated. For each frame in the input monocular video, the camera depth value is estimated as a moving relative scale value. Ground points are obtained from the input video and reprojected into the three-dimensional world place to determine depth. An example process for calculating the scale for relative depth is described in conjunction with FIG. 6.

At block 310, the scale calculated in block 308 is iteratively refined with a provided user input, the input to be received via the example graphical user interface of FIG. 7. Using the graphical user interface, the user draws a line between any two points (e.g., a line between lane markings) in a given frame of the input video and provides a distance measurement. Based on this measurement, the scaling factor is adjusted across all frames in the video in an iterative process.

At block 312, the scaling results are reported for visualization via the graphical user interface of FIG. 7.

Figure 4:
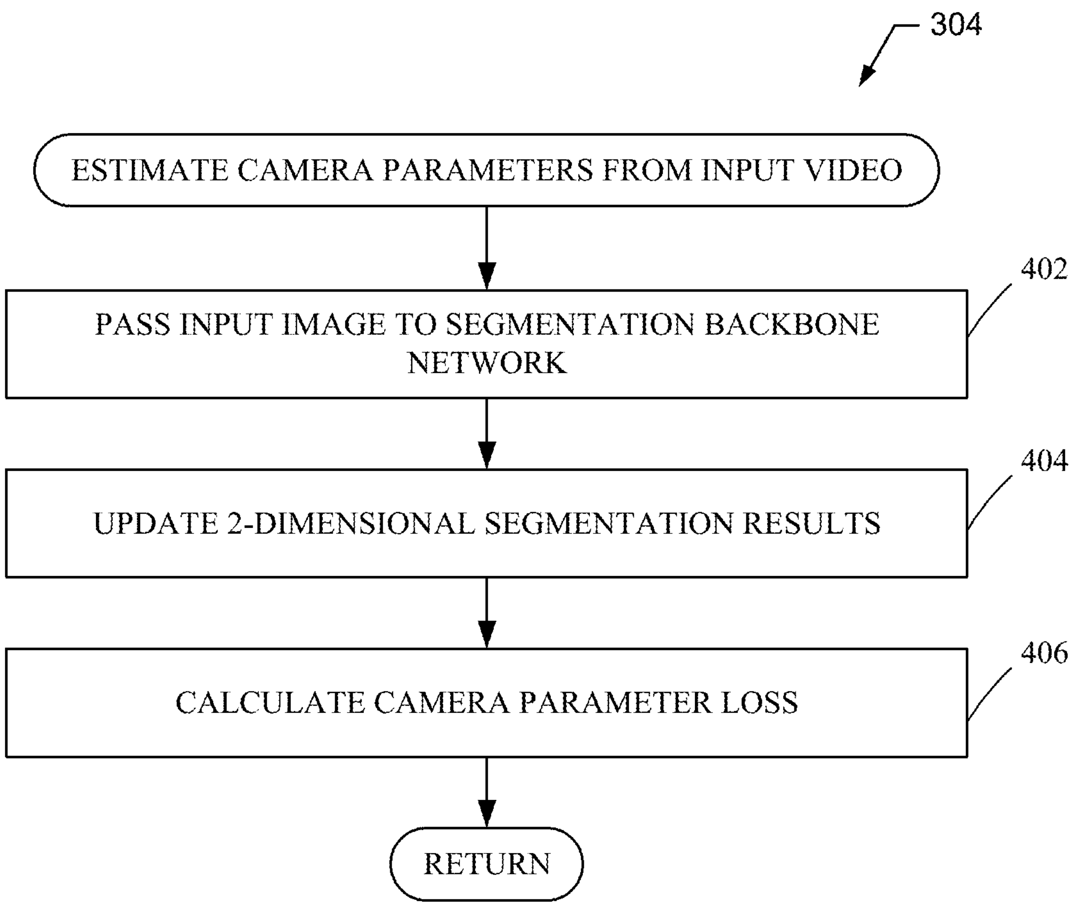

FIG. 4 is a flowchart representative of machine readable instructions which may be executed to implement block 304 of FIG. 3 to estimate the camera parameters (e.g., camera height, camera pitch) from the monocular input video.

At block 402, each frame of the monocular input video is passed to a segmentation backbone network (e.g., ERFNet) wherein the neural network will parse the input images to generate a two-dimensional segmentation of the surroundings of the camera.

At block 404, the two-dimensional segmentation results of block 402 are used to calculate the estimated camera parameters (e.g., camera height and camera pitch). The neural network processes the segmented video frame-by-frame to predict the three-dimensional layout of lanes on the road for each image. The camera height is determined relative to the ground plane by estimating the road projection plane. The road image is projected into a virtual top view model, and the estimated camera parameters for the video are calculated.

At block 406, the camera parameter loss is calculated by generating a virtual top-view visualization of the surroundings, using the camera parameters (e.g., camera pitch, camera height) estimated by the process in block 404. The error of prediction and ground-truth is determined, with lane detection loss calculated in the top-view model with cross-entropy and offsets with anchors.

Figure 5:
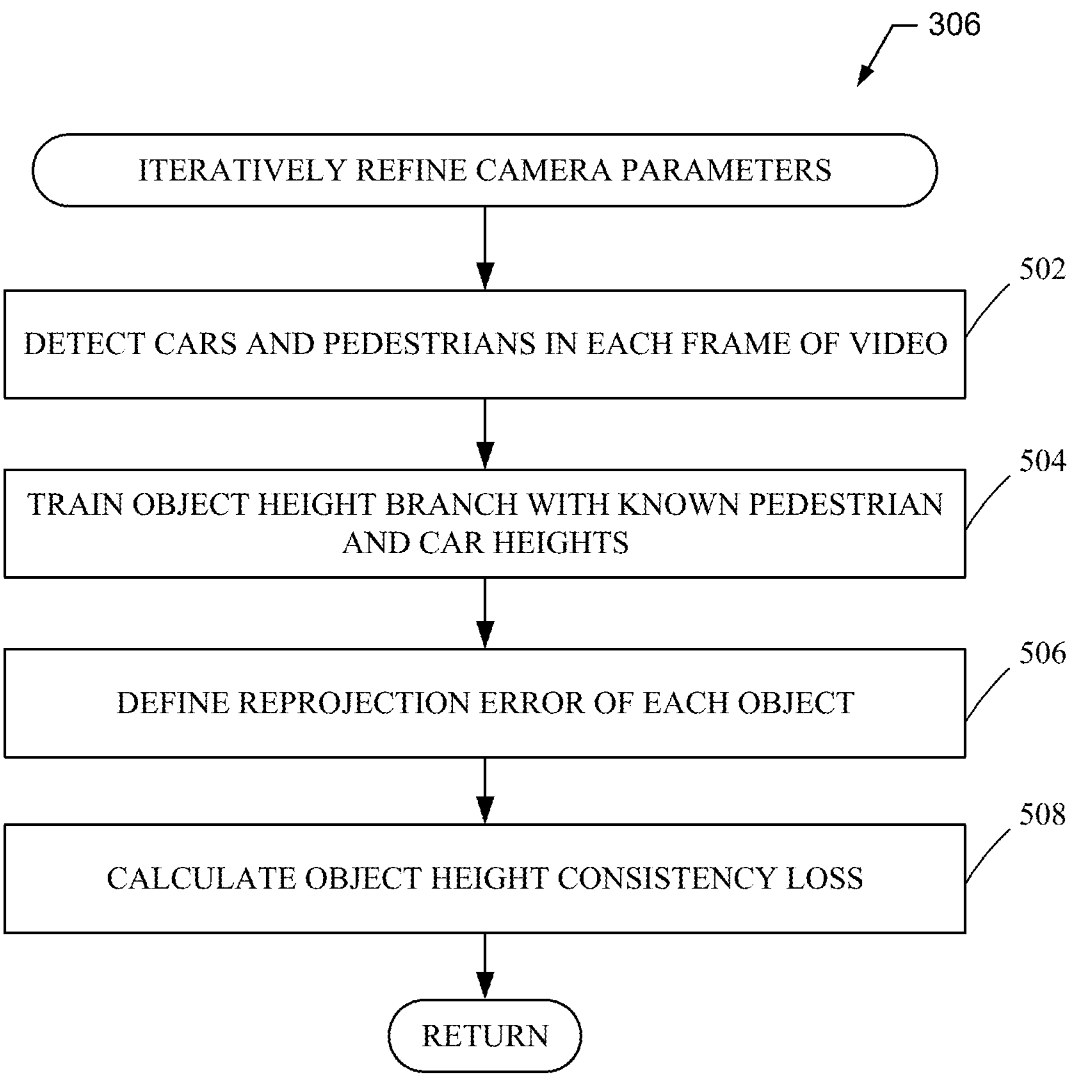

FIG. 5 is a flowchart representative of machine readable instructions which may be executed to implement block 306 of FIG. 3 to iteratively refine the estimated camera parameters.

At block 502, a Mask-RCNN deep neural network is utilized to automatically detect all cars and pedestrians in each frame of the monocular input video. These detected objects in the video scene form the detection branch of the neural network model.

At block 504, the object height branch is trained using a known pedestrian and car height, as provided by the publicly-available KITTI dataset. In some examples, the object height branch is trained using a Gaussian training model.

At block 506, the reprojection error for each camera object is defined. This reprojection error is calculated by projecting the i-th object with a detected two-dimensional bounding box onto the video frame, using the estimated camera pitch and camera height values.

At block 508, the object height consistency loss is calculated. Using the principle that the height of the same vehicle should be identical across all frames of the video, the object height consistency loss is determined by indicating the difference of an estimated object height across frames.

Figure 6:
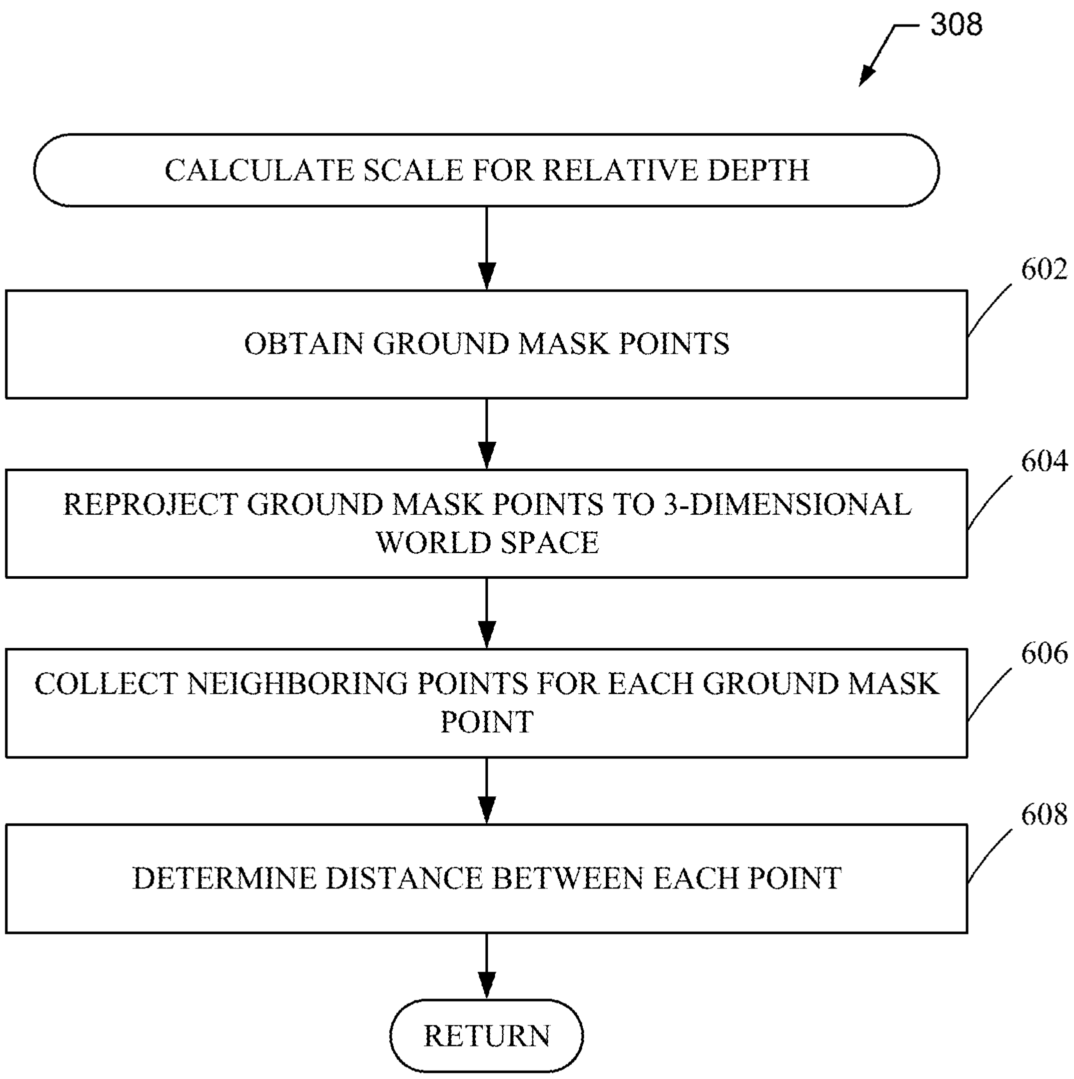

FIG. 6 is a flowchart representative of machine readable instructions which may be executed to implement block 308 of FIG. 3 to calculate the scale for relative depth.

At block 602, the ground mask points are obtained from the image segmentation mask.

At block 604, the obtained ground mask points are reprojected into the three-dimensional world space, for each image pixel.

At block 606, for each obtained ground mask point, eight neighboring points are collected.

At block 608, From the neighboring points, four local surfaces are derived by selecting four pairs of points that form 90-degree angles. The final surface norm of each world coordinate is the average of its four neighboring surfaces. Then, the angle between the world coordinate and ground is considered to determine whether the examined point is on the ground. For each point that is to be considered a ground mask point, the distance between that point and all other image pixels is calculated to derive the camera height and relative depth.

FIG. 7 illustrates an example graphical user interface 700 wherein a user can draw a line between any two points in a frame of the monocular input video and provide the distance (in meters) for scale calculation and/or scale refinement. In this graphical user interface, the user is able to skip through each individual frame of the input video using the video controls 710 in order to choose a frame. After choosing a video frame, the user may then choose any two points in the video (e.g., two adjacent lane lines) and connect them to draw the line 705. The user must then input the distance between the two chosen points (in meters) and select the auto calibrate button 715 to adjust the scale accordingly.

In some examples, the graphical user interface 700 may also include a trajectory plot 720 (if groundtruth values have been provided) wherein both the true and predicted trajectories of the ego vehicle are plotted in a top-view model for visualization. This trajectory plot 720 will populate in real-time as the video is played by the user.

Figure 8A:
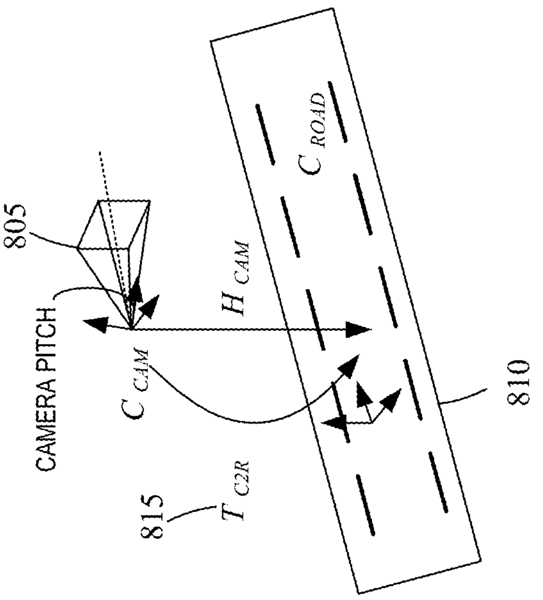
FIG. 8A is a two-dimensional depiction of an example camera position and road plane.

FIG. 8A depicts an example road structure in the three-dimensional plane, with a monocular video camera 805 mounted on top of an ego vehicle on a road 810 with a relative transformation ($T_{C2R}$) value 815. In some examples, the camera is assumed to be fixed at a zero-degree roll relative to the flat ground plane.

Figure 8B:
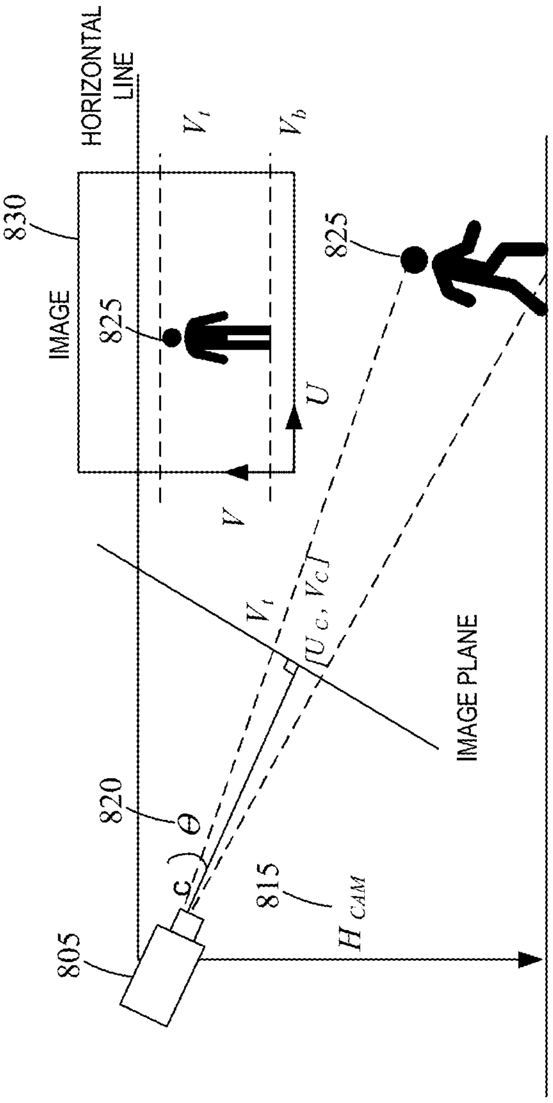
FIG. 8B is a one-dimensional illustration of an image projection to determine object height.

FIG. 8B illustrates an example road structure in the two-dimensional plane with a monocular video camera 805 mounted on top of an ego vehicle. The relative transformation ($T_{C2R}$) value is represented by the camera height ($H_{CAM}$) value 815 and the camera pitch (θ) angle 820. In some examples, the camera is assumed to be fixed at a zero-degree roll relative to the flat ground plane. An object in the scene (e.g., a pedestrian 825) is shown in front of the monocular video camera, and the reprojection model 830 of this object 825 is demonstrated above. In this depiction, the three-dimensional view of the pedestrian object 825 is displayed, along with a demonstration of object height calculation (as given by the projected lines $V_t$ and $V_b$).

Figure 9:
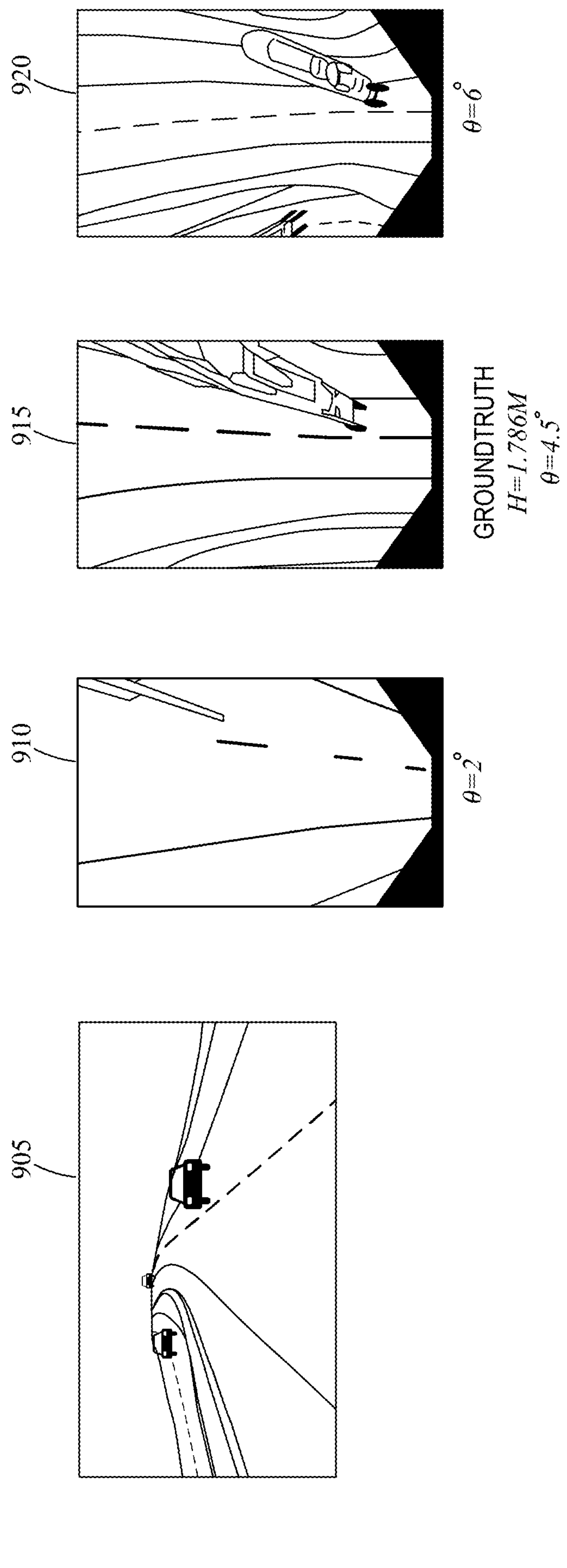
FIG. 9 is a depiction of parallel lane top-view distortion in response to height and pitch camera parameters.

FIG. 9 is an illustration of camera parameter (e.g., camera pitch and camera height) effects on top-view lane depictions. Cell 905 depicts the monocular input video provided to the scale recovery circuitry 110 of FIG. 1. The cells 910, 915, and 920 display raw image projections to a top-view lane model with varying camera parameter values. In cell 910, the camera pitch value of 2 degrees is less than the ground truth value, thus, the lanes in the top-view model look distorted at the boundaries and are not parallel. In cell 920, the camera pitch value has exceeded the ground truth parameter value, and therefore, the lanes are once again distorted and not parallel. Cell 915 illustrates how the correct camera parameter values (e.g., groundtruth) have produced a top-view raw image projection where the lanes are fully parallel and there is no image distortion at boundaries.

Figure 10:
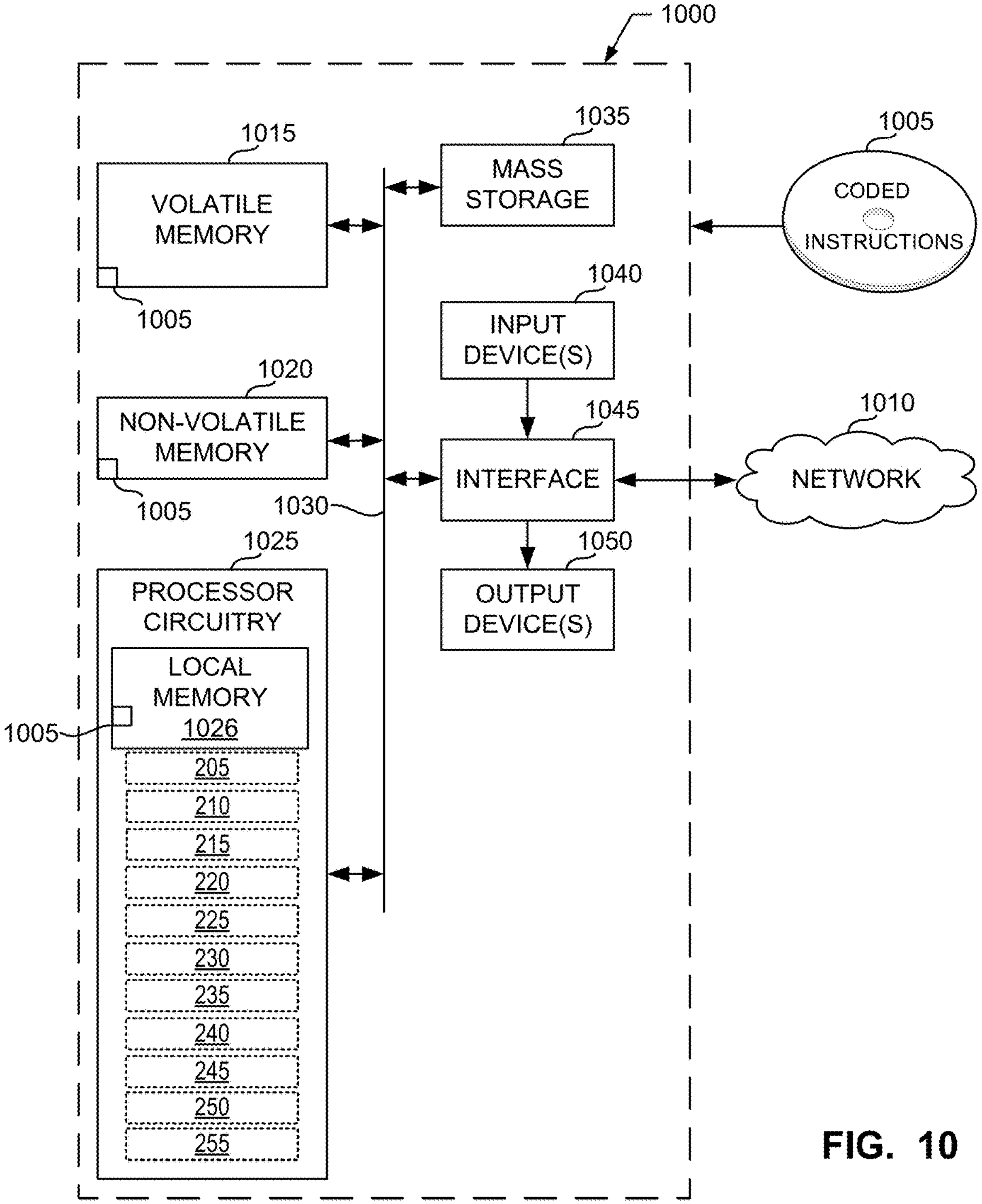
FIG. 10 is a block diagram of an example processing platform structured to execute the instructions of FIG. 3 to implement the scale recovery circuitry 110 of FIG. 1.

FIG. 10 is a block diagram of an example processor platform 1000 structured to execute the instructions of FIGS. 3-6 to implement the scale recovery circuitry 110 of FIG. 1. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1025. The processor circuitry 1025 of the illustrated example is hardware. For example, the processor circuitry 1025 can be implemented by one or more integrated circuits, logic circuits, FPGAs, microprocessors, CPUs, GPUs, DSPs, and/or microcontrollers from any desired family or manufacturer. The processor circuitry may be implemented by one or more semiconductor based (e.g., silicon based) devices. In this example, the processor circuitry 1025 implements the example data retrieval circuitry 205, the example input image segmentation circuitry 210, the example lane detection circuitry 215, the example error prediction circuitry 220, the example camera parameter refinement circuitry 225, the example object detection circuitry 230, the example object height loss calculator 235, the example relative depth scaling circuitry 240, the example relative translation scaling circuitry 245, the example iterative scale estimation circuitry 250, and the example trajectory plotting circuitry 255.

The processor circuitry 1025 of the illustrated example includes a local memory 1026 (e.g., a cache, registers, etc.). The processor circuitry 1025 of the illustrated example is in communication with a main memory including a volatile memory 1015 and a non-volatile memory 1020 via a bus 1030. The volatile memory 1015 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1020 may be implemented by flash memory and/or any other desired type of memory device. Access to the main memory 1015, 1020 is controlled by a memory controller.

The processor platform 1000 of the illustrated example also includes interface circuitry 1045. The interface circuitry 1045 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1040 are connected to the interface circuitry 1045. The input device(s) 1040 permit(s) a user to enter data and/or commands into the processor circuitry 1025. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1050 are also connected to the interface circuitry 1045 of the illustrated example. The output devices 1050 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speaker. The interface circuit 1045 of the illustrated example, thus, typically includes a graphics driver card, a graphics driver chip and/or a graphics driver processor.

The interface circuitry 1045 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1010. The communication can be via, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1035 for storing software and/or data. Examples of such mass storage devices 1035 include magnetic storage devices, floppy disk drives, HDDs, CDs, Blu-ray disk drives, redundant array of independent disks (RAID) systems, solid state storage devices such as flash memory devices, and DVD drives.

The machine executable instructions 1005, which may be implemented by the machine readable instructions of FIGS. 3-6 may be stored in the mass storage device 1035, in the volatile memory 1015, in the non-volatile memory 1020, and/or on a removable non-transitory computer readable storage medium such as a CD or DVD.

Figure 11:
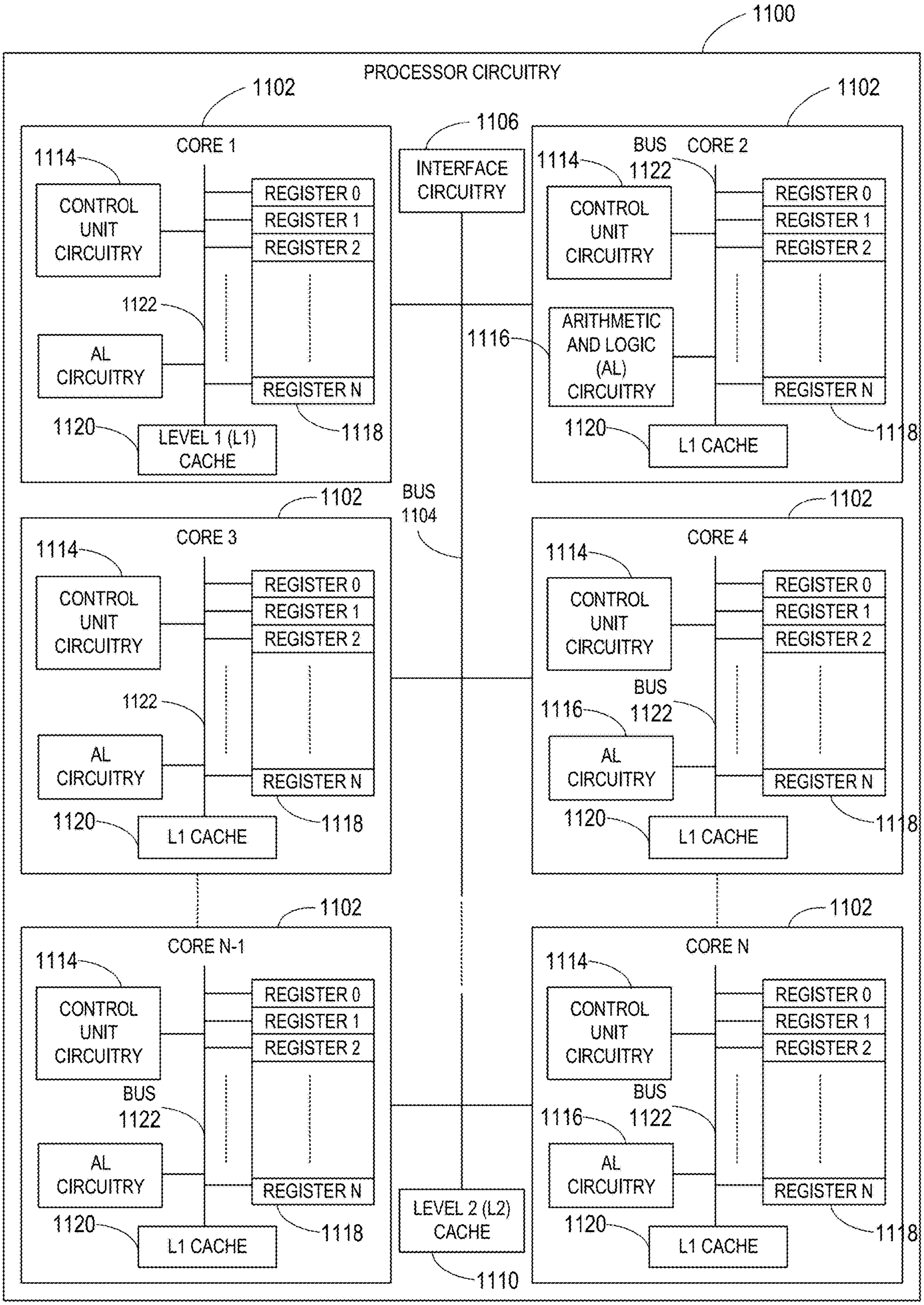
FIG. 11 is a block diagram of an example implementation of the processor circuitry of FIG. 10.

FIG. 11 is a block diagram of an example implementation of the processor circuitry 1025 of FIG. 10. In this example, the processor circuitry 1025 of FIG. 10 is implemented by a microprocessor 1100. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 3-6.

The cores 1102 may communicate by an example first bus 1104. In some examples, the first bus 1104 may implement a communication bus to effectuate communication associated with one(s) of the cores 1102. For example, the first bus 1104 may implement at least one of an Inter-Integrated Circuit (I2C) bus, a Serial Peripheral Interface (SPI) bus, a PCI bus, or a PCIe bus. Additionally or alternatively, the first bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2_cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1015, 1020 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache 1120, and an example second bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The second bus 1122 may implement at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
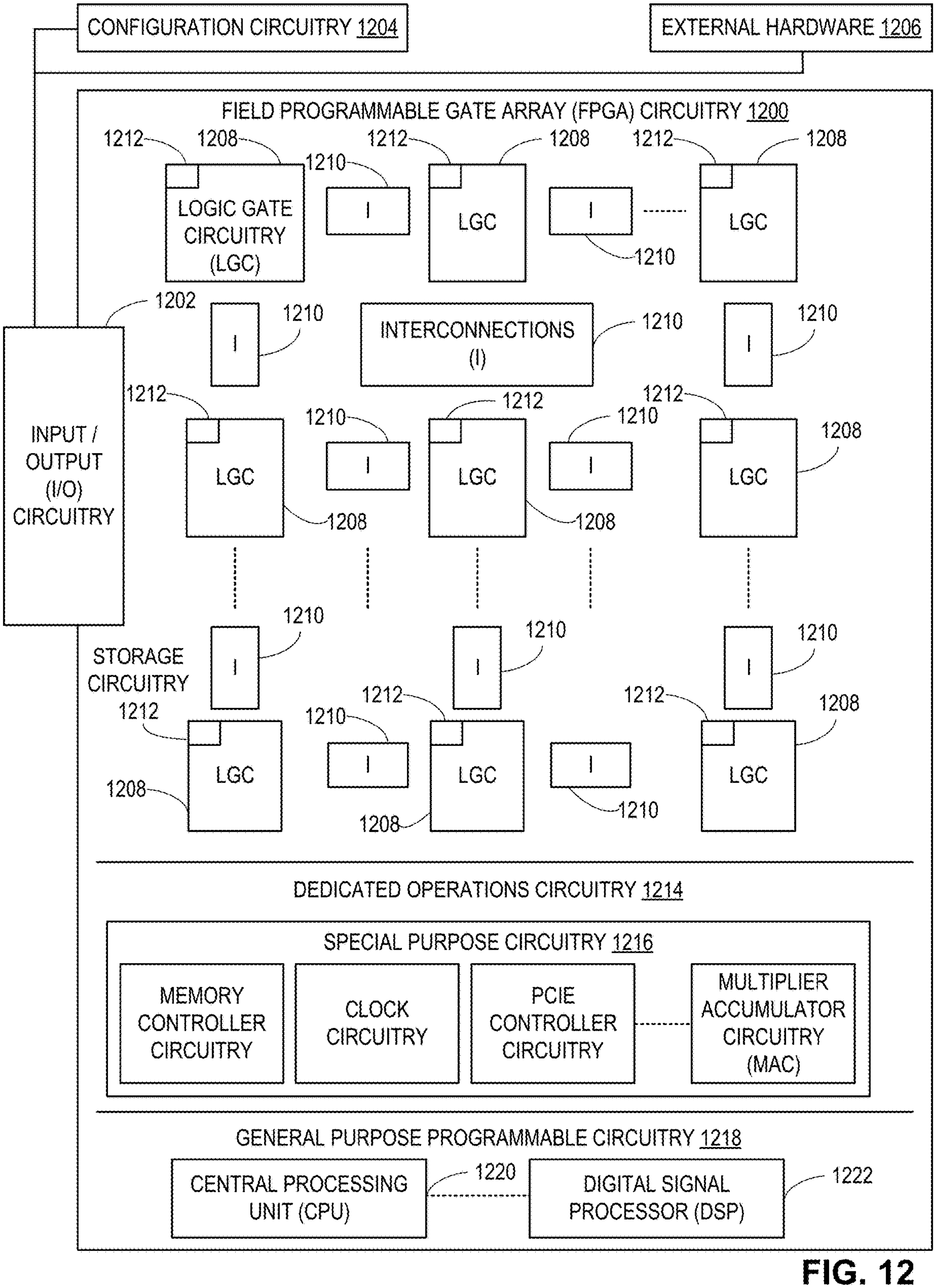
FIG. 12 is a block diagram of another example implementation of the processor circuitry of FIG. 10.
Figure 13:
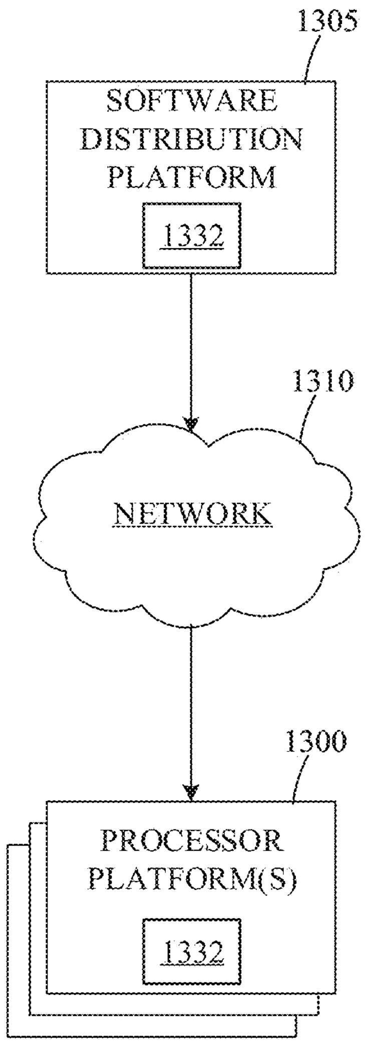
FIG. 13 is a block diagram of an example software distribution platform to distribute software (e.g., software corresponding to the example computer readable instructions of FIGS. 3, 4, 5, and/or 6.) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy consumers).

FIG. 12 is a block diagram of another example implementation of the processor circuitry 412 of FIG. 10. In this example, the processor circuitry 1025 is implemented by FPGA circuitry 1200. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 3-6 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 3-6. In particular, the FPGA 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 3-6. As such, the FPGA circuitry 1200 may be structured to effectively instantiate some or all of the machine readable instructions of the flowcharts of FIGS. 3-6 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 3-6 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine readable instructions of FIGS. 3-6 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1025 of FIG. 10, many other approaches are contemplated. For example, as mentioned above, modern FPGA circuitry may include an on-board CPU, such as one or more of the example CPU 1220 of FIG. 12. Therefore, the processor circuitry 1025 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowcharts of FIGS. 3-6 may be executed by one or more of the cores 1102 of FIG. 11 and a second portion of the machine readable instructions represented by the flowcharts of FIGS. 3-6 may be executed by the FPGA circuitry 1200 of FIG. 12.

In some examples, the processor circuitry 1025 of FIG. 10 may be in one or more packages. For example, the processor circuitry 1100 of FIG. 11 and/or the FPGA circuitry 1100 of FIG. 11 may be in one or more packages. In some examples, an XPU may be implemented by the processor circuitry 1025 of FIG. 10, which may be in one or more packages. For example, the XPU may include a CPU in one package, a DSP in another package, a GPU in yet another package, and an FPGA in still yet another package.

Example methods, apparatus, systems, and articles of manufacture to recover scale from a monocular input video are disclosed herein. Further examples and combinations thereof include the following:

Example 1 includes an apparatus comprising a non-transitory computer readable medium, instructions at the apparatus, a logic circuit to execute the instructions to at least segment an input image from a monocular video to detect an object in the camera field, estimate camera parameters from the segmented input image, iteratively refine the estimated camera parameters using object heights, calculate a scale for the video, iteratively refine the scale based on a user input, and report the scaling results for visualization.

Example 2 includes the non-transitory computer readable medium of example 1, wherein the monocular video camera provides direct input to the scale recovery circuitry.

Example 3 includes the non-transitory computer readable medium of example 1, wherein the instructions, when executed, further trigger the input image segmentation to be performed using a segmentation backbone network.

Example 4 includes the non-transitory computer readable medium of example 1, wherein the instructions, when executed, further trigger the video scale to be calculated using a first and second camera parameter.

Example 5 includes the non-transitory computer readable medium of any one of examples 1 and 4, wherein the instructions, when executed, further trigger the adjustment of the first and second camera parameters according to a projection model.

Example 6 includes the non-transitory computer readable medium of example 1, wherein the instructions, when executed, further trigger the reporting of scaling results via a graphical user interface.

Example 7 includes the non-transitory computer readable medium of example 1, wherein the object heights are obtained from a dataset.

Example 8 includes the non-transitory computer readable medium of any one of examples 1 and 7, wherein the instructions, when executed, further trigger the training of a branch of a neural network model using the object heights.

Example 9 includes the non-transitory computer readable medium of any one of examples 7 and 8, wherein the instructions, when executed, further trigger the adjustment of the first and/or second camera parameter using the trained branch of the neural network model.

Example 10 includes the non-transitory computer readable medium of example 1, wherein the user input for iterative scale refinement is provided via a graphical user interface.

Example 11 includes an apparatus to recover scale from monocular video, the apparatus comprising interface circuitry to access an image from a monocular video, and processor circuitry including one or more of at least one of a central processing unit, a graphic processing unit or a digital signal processor, the at least one of the central processing unit, the graphic processing unit or the digital signal processing having control circuitry to control data movement within the processor circuitry, arithmetic and logic circuitry to perform one or more first operations according to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to tore a result of the one or more second operations, or Application Specific Integrate Circuitry (ASIC) including logic gate circuitry to perform one or more third operations, the processor circuitry to perform at least one of the first operations, the second operations or the third operations to instantiate image segmentation circuitry to segment an input image from the monocular video to detect an object in the camera field, camera parameter refinement circuitry to iteratively refine the estimated camera parameters using object heights, relative depth scalar circuitry to calculate a scale for the video, iterative scale estimation circuitry to iteratively refine the scale based on a user input, and trajectory plotting circuitry to report the scaling results for visualization.

Example 12 includes the apparatus of example 11, wherein the monocular video camera provides direct input to the scale recovery circuitry.

Example 13 includes the apparatus of example 11, wherein the instructions, when executed, further trigger the input image segmentation to be performed using a segmentation backbone network.

Example 14 includes the apparatus of example 11, wherein the instructions, when executed, further trigger the video scale to be calculated using a first and second camera parameter.

Example 15 includes the apparatus of any one of examples 11 and 14, wherein the instructions, when executed, further trigger the adjustment of the first and second camera parameters according to a projection model.

Example 16 includes the apparatus of example 11, wherein the instructions, when executed, further trigger the reporting of scaling results via a graphical user interface.

Example 17 includes apparatus of example 11, wherein the object heights are obtained from a dataset.

Example 18 includes the apparatus of any one of examples 11 and 17, wherein the instructions, when executed, further trigger the training of a branch of a neural network model using the object heights.

Example 19 includes the apparatus of any one of examples 17 and 18, wherein the instructions, when executed, further trigger the adjustment of the first and/or second camera parameter using the trained branch of the neural network model.

Example 20 includes the apparatus of example 11, wherein the user input for iterative scale refinement is provided via a graphical user interface.

Example 21 includes a method for scale recovery from monocular video, the method comprising estimating camera parameters from a monocular input video, iteratively refining the estimated camera parameters, calculating the scale for relative depth, iteratively refining the scale with provided user input, and reporting the scaling results for visualization.

Example 22 includes the method of example 21, wherein the monocular video camera provides direct input to the scale recovery circuitry.

Example 23 includes method of example 1, wherein the instructions, when executed, further trigger the input image segmentation to be performed using a segmentation backbone network.

Example 24 includes the method of example 21, wherein the instructions, when executed, further trigger the video scale to be calculated using a first and second camera parameter.

Example 25 includes the method of any one of examples 21 and 24, wherein the instructions, when executed, further trigger the adjustment of the first and second camera parameters according to a projection model.

Example 26 includes the method of example 21, wherein the instructions, when executed, further trigger the reporting of scaling results via a graphical user interface.

Example 27 includes the method of example 21, wherein the object heights are obtained from a dataset.

Example 28 includes the method of any one of examples 21 and 27, wherein the instructions, when executed, further trigger the training of a branch of a neural network model using the object heights.

Example 29 includes the method of any one of examples 27 and 28, wherein the instructions, when executed, further trigger the adjustment of the first and/or second camera parameter using the trained branch of the neural network model.

Example 30 includes the method of example 21, wherein the user input for iterative scale refinement is provided via a graphical user interface.

Example 31 includes an apparatus for scale recovery from monocular video, the apparatus comprising means for estimating camera parameters from a monocular input video, means for iteratively refining the estimated camera parameters, means for calculating the scale for relative depth, means for iteratively refining the scale with provided user input, and means for reporting the scaling results for visualization.

Example 32 includes the apparatus of example 31, wherein the means for estimating camera parameters from a monocular input video is to further include the use of a segmentation backbone network.

Example 33 includes the apparatus of example 31, wherein the means for iteratively refining the estimated camera parameter is to further include the use of a lane detection network.

Example 34 includes the apparatus of example 31, wherein the means for calculating the scale for relative depth is to further include the calculation of a first and second camera parameter.

Example 35 includes the apparatus of any one of examples 31 and 34, wherein the instructions, when executed, further trigger the adjustment of at least one of the first or second camera parameters according to a projection model.

Example 36 includes the apparatus of example 31, wherein the means for iteratively refining the scale with provided user input is to further include the use of a graphical user interface.

Example 37 includes apparatus of example 31, wherein the means for reporting the scaling results for visualization is to further include the use of a graphical user interface.

From the foregoing, it will be appreciated that example methods, apparatus and articles of manufacture have been disclosed that extend the applications of recovering scale (e.g., absolute scale) from monocular video for traffic accident simulation, etc. Monocular video cameras are preferred over stereo video cameras for certain applications like autonomous driving vehicles, traffic cameras, etc. due to their low cost and ease of use.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A non-transitory computer readable medium comprising instructions to cause at least one processor circuit to at least:

segment an input image from a monocular video to detect an object in a camera field;

estimate at least one camera parameter from the segmented input image;

iteratively refine the estimated at least one camera parameter based on a height associated with the detected object;

calculate a scale for the video based on the at least one estimated camera parameter;

iteratively refine the scale based on a user input from a graphical user interface, the user input to specify a physical distance between two points in the input image;

generate a vehicle trajectory plot based on the scale; and cause display of the vehicle trajectory plot via the graphical user interface.

2. The non-transitory computer readable medium of claim 1, wherein the instructions are to cause one or more of the at least one processor circuit to segment the input image based on a segmentation backbone network.

3. The non-transitory computer readable medium of claim 1, wherein the at least one camera parameter includes a first camera parameter and a second camera parameter, and the instructions are to cause one or more of the at least one processor circuit to calculate the scale based on the first camera parameter and the second camera parameter.

4. The non-transitory computer readable medium of claim 3, wherein the instructions are to cause one or more of the at least one processor circuit to adjust the first camera parameter and the second camera parameter based on a projection model.

5. The non-transitory computer readable medium of claim 1, wherein the instructions are to cause one or more of the at least one processor circuit to determine the height of the detected object based on a neural network, a branch of the neural network model trained based on a plurality of object heights.

6. The non-transitory computer readable medium of claim 3, wherein the first camera parameter is a camera height and the second camera parameter is a camera pitch.

7. An apparatus comprising:

interface circuitry;

machine-readable instructions; and at least one programmable circuit to be programmed based on the machine-readable instructions to:

segment an input image from monocular video to detect an object in a camera field;

estimate at least one camera parameter from the segmented input image; and iteratively refine the estimated at least one camera parameter based on a height associated with the detected object;

calculate a scale for the video based on the at least one estimated camera parameter;

iteratively refine the scale based on a user input from a graphical user interface, the user input to specify a physical distance between two points in the input image;

generate a vehicle trajectory plot based on the scale; and cause display of the vehicle trajectory plot via the graphical user interface.

8. The apparatus of claim 7, wherein one or more of the at least one programmable circuit is to segment the input image based on a segmentation backbone network.

9. The apparatus of claim 7, wherein the at least one camera parameter includes a first camera parameter and a second camera parameter, and one or more of the at least one programmable circuit is to calculate the scale based on the first camera parameter and the second camera parameter.

10. The apparatus of claim 9, wherein one or more of the at least one programmable circuit is to adjust the first camera parameter and the second camera parameter based on a projection model.

11. The apparatus of claim 7, wherein one or more of the at least one programmable circuit is to determine the height of the detected object based on a neural network, a branch of the neural network trained based on a plurality of object heights.

12. The apparatus of claim 9, wherein the first camera parameter is a camera height and the second camera parameter is a camera pitch.

13. A method comprising:

segmenting an input image from monocular video to detect an object in a camera field;

estimating at least one camera parameter from the segmented input video;

iteratively refining the estimated at least one camera parameter based on a height associated with the detected object;

calculating a scale for the video based on the at least one estimated camera parameter;

iteratively refining the scale based on user input from a graphical user interface, the user input to specify a physical distance between two points in the input image;

generating a vehicle trajectory plot based on the scale; and displaying the vehicle trajectory plot via the graphical user interface.

14. The method of claim 13, wherein the segmenting of the input image is based on a segmentation backbone network.

15. The method of claim 13, wherein the at least one camera parameter includes a first camera parameter and a second camera parameter, and the calculating of the scale is based on the first camera parameter and the second camera parameter.

16. The method of claim 15, wherein the iteratively refining of the estimated at least one camera parameter includes adjusting the first camera parameter and the second camera parameter based on a projection model.

17. The non-transitory computer readable medium of claim 1, wherein the instructions are to cause one or more of the at least one processor circuit to:

provide the segmented image to a neural network, the neural network trained to predict a three-dimensional (3D) layout of lanes on a road based on road geometry identified in the segmented image; and estimate the at least one camera parameter based on the predicted 3D layout of the lanes on the road.

18. The non-transitory computer readable medium of claim 17, wherein the instructions are to cause one or more of the at least one processor circuit to iteratively estimate the at least one camera parameter to reduce a combination of a first loss based on an error associated with the estimate of the at least one camera parameter and a second loss based on an error associated with the predicted 3D layout of the lanes on the road.

19. The apparatus of claim 7, wherein one or more of the at least one programmable circuit is to:

provide the segmented image to a neural network, the neural network trained to predict a three-dimensional (3D) layout of lanes on a road based on road geometry identified in the segmented image; and estimate the at least one camera parameter based on the predicted 3D layout of the lanes on the road.

20. The apparatus of claim 19, wherein one or more of the at least one programmable circuit is to iteratively estimate the at least one camera parameter to reduce a combination of a first loss based on an error associated with the estimate of the at least one camera parameter and a second loss based on an error associated with the predicted 3D layout of the lanes on the road.

* * * * *